United States Patent
Kim

(10) Patent No.: US 11,847,691 B2
(45) Date of Patent: Dec. 19, 2023

(54) SYSTEMS AND METHODS FOR GENERATING A CREDIT SCORE BASED AT LEAST IN PART UPON TELEMATICS DATA

(71) Applicant: BlueOwl, LLC, San Francisco, CA (US)

(72) Inventor: Michael Sungjun Kim, Larkspur, CA (US)

(73) Assignee: BLUEOWL, LLC, San Francisco, CA (US)

( * ) Notice: Subject to any disclaimer, the term of this patent is extended or adjusted under 35 U.S.C. 154(b) by 161 days.

(21) Appl. No.: 16/803,318

(22) Filed: Feb. 27, 2020

(65) Prior Publication Data

US 2023/0214916 A1    Jul. 6, 2023

(51) Int. Cl.
| | | |
|---|---|---|
| G06Q 40/00 | (2023.01) | |
| G06Q 40/03 | (2023.01) | |
| G07C 5/00 | (2006.01) | |
| G06Q 30/0201 | (2023.01) | |
| G01C 21/10 | (2006.01) | |
| G06N 5/04 | (2023.01) | |
| G06N 20/00 | (2019.01) | |
| G06N 5/02 | (2023.01) | |

(52) U.S. Cl.
CPC ............. G06Q 40/03 (2023.01); G01C 21/10 (2013.01); G06N 5/02 (2013.01); G06N 5/04 (2013.01); G06N 20/00 (2019.01); G06Q 30/0201 (2013.01); G07C 5/008 (2013.01)

(58) Field of Classification Search
CPC .. G06Q 40/025; G06Q 30/0201; G01C 21/10; G06N 5/02; G06N 5/04; G06N 20/00; G07C 5/008
See application file for complete search history.

(56) References Cited

U.S. PATENT DOCUMENTS

| | | | |
|---|---|---|---|
| 8,407,139 B1* | 3/2013 | Palmer | G06Q 40/025 705/37 |
| 8,744,946 B2 | 6/2014 | Shelton | |
| 9,754,425 B1* | 9/2017 | Iqbal | G07C 5/008 |
| 9,818,158 B1 | 11/2017 | Devereaux et al. | |
| 9,898,779 B2 | 2/2018 | Haggerty et al. | |
| 9,990,781 B2* | 6/2018 | Haidar | G07C 5/006 |
| 10,960,895 B1* | 3/2021 | Gaudin | B60W 40/09 |

(Continued)

FOREIGN PATENT DOCUMENTS

| | | | | |
|---|---|---|---|---|
| WO | WO-2018048870 A1 * | 3/2018 | | G06F 3/147 |

OTHER PUBLICATIONS

Yao: "Evolution of Insurance: A Telematics-Based Personal Auto Insurance Study", Honors Scholar Thesis, Honors Scholar Program, University of Connecticut, Spring 2018 (Year: 2018).*

*Primary Examiner* — Edward J Baird
(74) *Attorney, Agent, or Firm* — BRYAN CAVE LEIGHTON PAISNER LLP

(57) ABSTRACT

A user's credit score is determined based at least in part upon collected telematics data and user data associated with the user. A credit score prediction model is created using training datasets of historical data including demographics data, driver profile data, and established credit scores. The credit score prediction model is then used to predict credit scores for users without formal credit scores. A user's credit score is predicted based at least in part upon a driver profile built using telematics data, among other factors.

15 Claims, 7 Drawing Sheets

(56) References Cited

U.S. PATENT DOCUMENTS

| | | | |
|---|---|---|---|
| 2010/0030586 A1* | 2/2010 | Taylor | G06Q 30/02 |
| | | | 705/4 |
| 2014/0322676 A1* | 10/2014 | Raman | G09B 19/167 |
| | | | 434/65 |
| 2015/0254573 A1* | 9/2015 | Abu-Mostafa | G06N 5/003 |
| | | | 706/12 |
| 2016/0225095 A1* | 8/2016 | Biemer | G06Q 40/02 |
| 2019/0102840 A1* | 4/2019 | Perl | G06Q 40/08 |
| 2021/0133808 A1* | 5/2021 | Chan | B60W 40/09 |
| 2021/0312560 A1* | 10/2021 | Hayward | G06N 3/088 |

* cited by examiner

| USER | DEMOGRAPHICS | DRIVING PROFILE | CREDIT SCORE |
|---|---|---|---|
| User 1 | Income, ethnicity | Safe/unsafe | Score (300-850) |
| User 2 | Income, ethnicity | Safe/unsafe | Score (300-850) |
| User N | Income, ethnicity | Safe/unsafe | Score (300-850) |
| ... | ... | ... | ... |

SYSTEMS AND METHODS FOR GENERATING A CREDIT SCORE BASED AT LEAST IN PART UPON TELEMATICS DATA

FIELD OF THE DISCLOSURE

The present disclosure relates to systems and methods for a credit score predictor based at least in part upon telematics data, and more particularly, to systems and methods for generating a credit score for a person based at least in part upon the person's driving habits captured as vehicle telematics data.

BACKGROUND

A credit score may represent the creditworthiness of an individual. Typically, a credit score is a three digit number ranging between 300 and 850. A credit score between 300 and 629 is rated poorly; a score between 630 and 689 is considered fair; a score between 690 and 719 is considered good; and a score above 720 is considered an excellent credit score. A credit score is generally based at least in part upon information included in a credit report. In the United States, credit scores are primarily used by banks and credit card issuers, among others, to determine the potential risk of a potential consumer. In some instances, a credit score is used to determine loan qualifications and interest rate along with other loan details, such as the duration of a loan. Credit card issuers rely on credit scores to determine whether a consumer at least qualifies for a credit card and, if so, an annual rate expressed as a percentage (APR) as well as a credit limit. Other factors may be taken into consideration for a line of credit, loan, or credit card based at least in part upon a consumer's credit history.

Credit reports are typically generated, in the United States, by three credit reporting agencies, Equifax®, Experian®, and TransUnion®. A typical credit report provides a snapshot of a consumer's financial history. A financial history of a consumer typically includes bill and/or loan payment history, current debt levels, outstanding balances, length of credit history, types of credit accounts, as well as other personal information, such as bankruptcy filings, applications for new credit accounts, arrest history, and whether the consumer has been sued. Creditors, prospective employers, insurers, and even rental property owners utilize credit reports during the application process.

While credit reports provide a detailed history of a consumer's creditworthiness, some consumers, such as consumers with little to no credit history, may find it difficult to prove their actual creditworthiness. Current solutions lack the ability to provide accurate credit scores for consumers with little to no credit history.

BRIEF SUMMARY

The present embodiments may relate to, inter alia, systems and methods for generating a consumer's credit score using vehicle telematics data associated with the consumer that are captured when the consumer is driving the vehicle. Some exemplary embodiments of the systems and methods described herein may use, for example, a global positioning system (a GPS), an accelerometer, and a gyroscope, to gather telematics data. In some embodiments, the systems and methods may be in communication with different databases (e.g., third party databases) to gather demographics data. Gathered telematics data, and in some embodiments, demographics data may be used to generate a model correlating the gathered data with credit scores. In some embodiments, the generated model of telematics data may be utilized to provide an accurate prediction of a consumer's credit score. Thus, a consumer without much credit history, or one seeking to avoid the expenses of having a conventional credit report generated and provided, can still have a credit report generated using their telematics data.

In an exemplary embodiment, systems and methods may be provided for the generation of a credit score prediction model. The credit score prediction model may be created through the gathering of established user data records and historical data. The user data records may include different information including user driving history, demographics data, and user credit histories. A portion of the data included in the user data records may be self-reported by users. Another portion of the data may include data reported from one or more measurement sensory devices, such as a GPS device, an accelerometer, a gyroscope, or other sensors mounted within a user computing device or integrated into the vehicle driven by the user. In some embodiments, additional portions of the user data records may be reported by one or more reputable credit reporting agencies.

In another exemplary embodiment, systems and methods may be provided for generating a user's credit score based at least in part upon a credit score prediction model that uses vehicle telematics data to predict the credit score. The system may be configured to receive a plurality of different data sets relating to a user to predict the user's credit score. User data input may include driver profile data, demographics data, or any other types of data. Based at least in part upon correlations made by the credit score prediction model, user's credit score may be accurately predicted based at least in part upon the user data input provided. In some embodiments, driver profile data may be ascertained via one or more sensory devices, such as a GPS device, an accelerometer, and a gyroscope, among other sensory devices used to gather driver characteristics data while the user is operating a vehicle. When demographics data are used, along with the telematics data, to predict the credit score, the demographics data may be ascertained from the user themselves as well as from other data sources, such as census data or the like.

In a first aspect, a credit score prediction (CSP) computing device comprising at least one processor in communication with a memory device may be provided. The at least one processor may be configured to: (1) retrieve, from the memory device, at least one of historical user data, historical vehicle telematics data, and historical credit score data associated with a plurality of users, (2) build a model relating the historical credit score data to the historical user data and the historical vehicle telematics data, wherein the model configured to predict a credit score based at least in part upon user data and vehicle telematics data, (3) store the model in the memory device, (4) receive current vehicle telematics data associated with the user, and (5) predict a credit score associated with the user using the model based at least in part upon the received current vehicle telematics data. The CSP computing device may include additional, less, or alternate functionality, including that discussed elsewhere herein.

In another aspect, a method for predicting a credit score of a user is provided. The computer implemented method may include: (1) retrieving, from the memory device, at least one of historical user data, historical vehicle telematics data, and historical credit score data associated with a plurality of users, (2) building a model relating the historical credit score data to the historical user data and the historical vehicle telematics data, wherein the model configured to predict a credit score based at least in part upon user data and vehicle telematics data, (3) storing the model in the memory device, (4) receiving current vehicle telematics data associated with the user, and (5) predicting a credit score associated with the user using the model based at least in part upon the received current vehicle telematics data. The method computing device may include additional, less, or alternate steps, including that discussed elsewhere herein.

In yet another aspect, a non-transitory computer-readable media having computer-executable instructions embodied thereon is provided. The instructions, when executed by a credit score prediction (CSP) computing device including one processor in communication with a memory device cause the at least one processor to: (1) retrieve, from the memory device, at least one of historical user data, historical vehicle telematics data, and historical credit score data associated with a plurality of users, (2) build a model relating the historical credit score data to the historical user data and the historical vehicle telematics data, wherein the model configured to predict a credit score based at least in part upon user data and vehicle telematics data, (3) store the model in the memory device, (4) receive current vehicle telematics data associated with the user, and (5) predict a credit score associated with the user using the model based at least in part upon the received current vehicle telematics data. The instructions may cause additional, less, or alternative functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

Depending upon embodiment, one or more benefits may be achieved. These benefits and various additional objects, features and advantages of the present invention can be fully appreciated with reference to the detailed description and accompanying drawings that follow.

BRIEF DESCRIPTION OF THE DRAWINGS

FIG. 4 illustrates an exemplary table of a training data set that may be used with the CSP computer system illustrated in FIG. 1.

Figure 1:
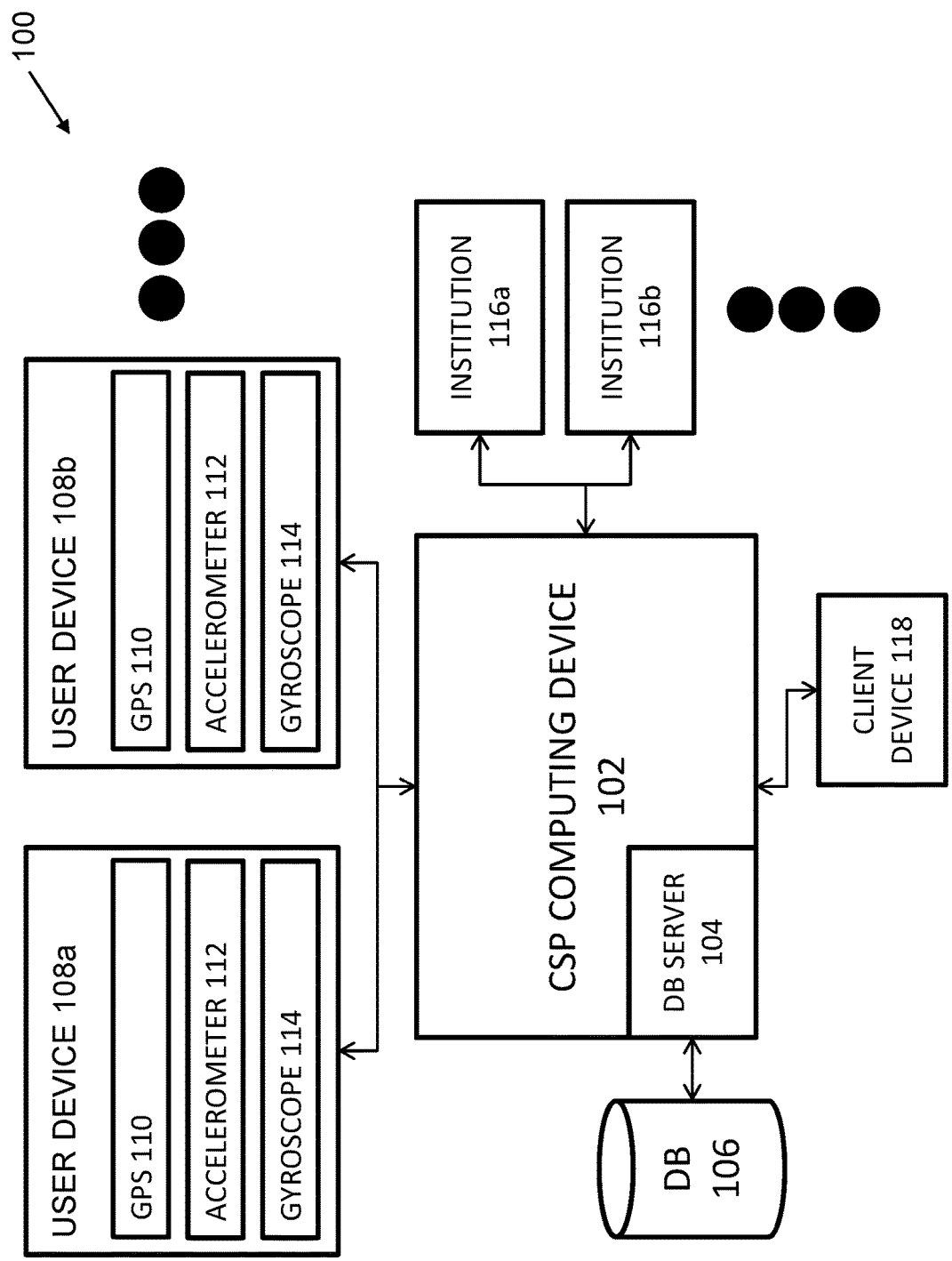
FIG. 1 illustrates an exemplary credit score prediction (CSP) computer system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles described herein.

DETAILED DESCRIPTION OF THE DRAWINGS

The present embodiments may relate to, inter alia, systems and methods for generating a credit score prediction model that may be used to determine a credit score for a consumer/user, wherein the model is based at least in part upon vehicle telematics data and user data of the consumer. In some embodiments, the systems and methods described herein may also include preparing a credit score prediction for a user based at least in part upon results provided by the prediction model. The prediction model may predict a credit score of a user based at least in part upon one or more values or measurements associated with the user and the driving habits of the user (e.g., captured as vehicle telematics data from one or more telematics sensors). In one exemplary embodiment, the process may be performed by a credit score prediction (CSP) computing device.

In some exemplary embodiments, the systems and methods described herein may additionally or alternatively include the creation of a credit score prediction model based at least in part upon a plurality of training datasets. Training datasets may include cross-referenced information and correlated data. In some embodiments, a training dataset may include a plurality of records for a plurality of respective users. For example, in an exemplary training dataset, a single record may include fields populated with user data including, but not limited to, a user identifier, name, demographics data, a credit score, or the like.

The systems and methods described herein may additionally or alternatively include the predicting a user's credit score (e.g., a "ground truth" of the user's credit score) based at least in part upon telematics and user data. In some embodiments, the user's credit score may predict other types of personal information. Such personal information that may be predicted may include income, education level, age, or the like.

As described below, systems and methods described herein generate a credit score prediction model using telematics data, credit score data, and, in some embodiments, demographic data. The systems and methods may further include steps to accurately predict credit scores for a consumer in view of the credit score prediction model by leveraging the consumer's data, including telematics data and, in some embodiments, demographics data of the consumer. As used herein, "consumer" or "user" refers to any type of user of the system that either provides data for building a training dataset for the credit score prediction model or, alternatively, provides data to the system to enable the system to accurately predict a credit score for that user. As used herein, "telematics data" refers to any type of information or measurements that may be collected while a user is operating a vehicle, such as velocity, acceleration, direction, driver behaviors (hard braking, jackrabbit starts, etc.), or the like. As used herein, "demographics" refers to any type of information that may accurately describe a population, such as age, income level, occupation, race, gender, or the like. As used herein, a "credit score" refers to any type of score that may be assigned to a consumer to accurately predict their credit trustworthiness. By so doing, a consumer's credit score may be predicted based at least in part upon user data and vehicle telematics data associated with the consumer.

In some exemplary embodiments, the systems and methods may be used to implement a process for using telematics data to make an accurate prediction of the user's credit score. The predicted credit score information may be monetized and sold to third parties. In some embodiments, the consumer credit scores may be sold on a marketplace.

Examples of Receiving Credit Score Prediction Model Training Datasets

The CSP computing device may create a credit score prediction model based at least in part upon a plurality of training datasets. Training datasets may include cross-referenced information and correlated data. In some embodiments, a training dataset may include a plurality of records for a plurality of respective users. For example, in an exemplary training dataset, a single record may include fields populated with user data including, but not limited to, a user identifier, name, demographics data, a credit score, or the like.

In some embodiments, the systems and methods described herein may additionally or alternatively include the forming of training datasets. Datasets may include cross-referenced information and correlated data. Data trends may be identified based at least in part upon a large set of user data records. In some embodiments, a dataset may include a plurality of records for multiple users. For example, in an exemplary training dataset, a single record may include fields populated with user data including, but not limited to, a user identifier, name, demographics data, a credit score, or the like.

In some embodiments, training datasets may be formed from a plurality of different sources. For example, a dataset may include a plurality of different types of demographics data. Demographics data may be provided by an actual user in the form of self-identification, geo-location services, such as a data reported from a GPS device, motion sensory devices, or through data mining of other types of sources available. Other sources may include, for example, public data records, census data, public social media profiles, or the like. Demographics data may include any type of information used to identify a population and their characteristics. For example, population characteristics may include such quantifiable characteristics such as education, nationality, religion, and ethnicity. Other characteristics may include gender, age, income level, and occupation, among others. In some embodiments, demographic mapping may be used for the training dataset. For example, demographic mapping may be used to show data by region or geographic area of a certain population of users. In other embodiments, only telematics data and credit score data may be used in the training datasets. That is, the training datasets may not include demographics data.

A plurality of users may transmit telematics data as part of the training datasets for creating the credit score prediction model. The plurality of users may each be associated with at least one user device. In some embodiments, each user may be associated with a plurality of user devices (e.g., mobile devices and/or other sensors mounted on or within a vehicle). The plurality of user devices may include one or more components for capturing and generating telematics data, such as a GPS device, an accelerometer, a gyroscope, or any other device capable of capturing data. The CSP computing device may use this collected data for data manipulation techniques for establishing a training dataset which may then be used to create a credit score prediction model.

In some embodiments, the training datasets may include driver profiles of users. A driver profile may indicate how safe, or unsafe, a user is behind the wheel. How safe somebody is behind the wheel may be determined through analysis of gathered driving characteristics based off of telematics data. In some embodiments, driver characteristics may be gathered over time by one or more sensory devices. For example, a combination of navigational sensory devices, such as a global positioning system (a GPS device), an accelerometer, and a gyroscope may be used to create a set of telematics data pertaining to a user. Other sensors may be used as part of the telematics data gathering system. The set of gathered telematics data measurements may then be processed and analyzed to provide a user driver profile.

A user's driver profile, in some embodiments, may indicate how safe the user is behind the wheel. For example, a safety rating may be assigned to a user based at least in part upon their driving habits. Gathered telematics data may indicate a plurality of different measurements that reveal a user's driving habits. Certain driving habits may include rate of acceleration, braking events, cornering (quick or sharp turns versus slow turns), speed limit adherence, and mobile phone usage while driving, among other parameters. In some embodiments, a user's driving profile may be created over a certain period of time and updated continuously, thereby creating a more accurate portrayal of a user's driver safety rating.

In some embodiments, training datasets may also include established credit scores of the plurality of users. The plurality of users may have their credit scores reported by reputable agencies to prove their accuracy. For example, an authentic credit report may be furnished on behalf by a reputable credit reporting agency. Such an agency may include Equifax®, TransUnion®, or Experian®. One or more of the reputable credit reporting agencies may furnish what is called a FICO credit score and is based at least in part upon data that is provided within a user's credit report. Data may vary between reports generated by different reporting agencies, therefore a different FICO credit score may be reported by different agencies. A FICO score may be based at least in part upon the user's credit report that may include certain statistics, such as on-time payments, credit capacity used, length of credit history, types of credit used, and past credit applications. In some embodiments, training datasets may collect user credit report data from any or all of the credit reporting agencies.

The CSP computing device may, in some embodiments, be configured to handle "big data" or the gathering of large amount of data from many sources. Gathered data may be stored and analyzed to create the training datasets described herein to build the CSP data model.

Examples of Determining a User's Credit Score Based at Least in Part Upon the Credit Score Prediction Model In some embodiments, the CSP computing device may predict a consumer's credit score in view of a generated credit score prediction model. In some instances, certain populations may not possess a credit history. Further, some users may not wish to obtain a credit score through traditional means (e.g., through credit report agencies). These users may benefit from a system that accurately predicts their actual credit score. The system may allow users without a formal credit score access to loan products (e.g., mortgages, auto loans) or other products where it may be needed for a credit score to be furnished (e.g., cell phone plans, employment, applying for leases, etc.). Populations that may have difficulty providing a formal credit score may include, for example, young people lacking a credit history, citizens of developing countries, citizens of emerging markets, and immigrants.

The CSP computing device may collect user data (e.g., demographics data and location data) for determining a user's credit score from a plurality of data sources, such as third party data sources (e.g., census data, social media data, etc.). In some embodiments, demographics data may be reported directly by the users after the user agrees to provide the demographic data (e.g., by accepting terms and conditions). Alternatively, user data may be collected from different data records like census data records after the users have agreed to and/or opted-in to allow the CSP computing device to use and gather the user data. If user data are used by the CSP computing device to predict credit scores of users, the CSP computing device may securely store anonymized user data or just use the user data to predict the credit score without storing the user data such that no personally identifying data are stored by the CSP computing device.

In some exemplary embodiments, users may each be associated with a user device, such as a mobile device or tablet computing device. Each user device may be enabled to collect driving behavior data, or telematics data, while the user is operating a vehicle. The user device may include one or more components configured to collect driving characteristics data over time. Further, the user device may be associated with one or more remote devices configured to collect telematics data. The components of the user devices may include sensory components such as one or more GPS devices, one or more accelerometers, and one or more gyroscopes. Collected telematics data may reveal a user's tendency behind the wheel with respect to being a relatively safe or unsafe driver. Such data may include a user's typical speed with respect to a posted speed limit, braking tendencies (e.g., hard braking events vs. soft braking events), cornering (e.g., sharp vs. smooth cornering), number of accidents, complete stops at stop signs, or even mobile phone usage during vehicle operation, among other quantifiable characteristics.

Exemplary Systems for Predicting a Credit Score

FIG. 1 depicts an exemplary credit score prediction (CSP) computer system 100. CSP computer system 100 may include a CSP computing device 102 (also referred to herein as CSP server or CSP computer device). CSP computing device 102 may include a database server 104. CSP computing device 102 may be in communication with, for example, one or more of a database 106, one or more user devices 108a and 108b, one or more institution devices 116a and 116b, and a client computing device 118.

In the exemplary embodiment, user devices 108a and 108b may be computers that include a web browser or a software application, which enables user devices 108a and 108b to access remote computer devices, such as CSP computing device 102, using the Internet or other network. More specifically, user devices 108a and 108b may be communicatively coupled to CSP computing device 102 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. User devices 108a and 108b may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Further, in the exemplary embodiment, user devices 108a and 108b may include a GPS 110, an accelerometer 112, and a gyroscope 114. GPS 110, accelerometer 112, and gyroscope 114 may be configured to gather telematics data associated with the users associated with user devices 108a and 108b. Further, CSP computing device 102 may use the telematics data to create driving profiles including driving characteristics for the users associated with user devices 108a and 108b. CSP computing device 102 may use the driving profiles of the users to predict credit scores of the users using a credit score prediction model generated by CSP computing device 102.

Institution devices 116a and 116b may be computers that include a web browser or a software application, which enables institutions devices 116a and 116b to access remote computer devices, such as CSP computing device 102, using the Internet or other network. In some embodiments, institution devices 116a and 116b may be associated with, or part of a computer network associated with, institutions like banks, financial institutions, credit card companies, etc., or in communication with the institution's computer network (not shown). In other embodiments, institution devices 116a and 116b may be associated with a third party and are merely in communication with the institution's computer network. That is, institution devices 116a and 116b may be associated with the institutions associated users. More specifically, institution devices 116a and 116b may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Institution devices 116a and 116b may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Client device 118 may be a computer that includes a web browser or a software application, which enables client device 118 to access remote computer devices, such as CSP computing device 102, using the Internet or other network. In some embodiments, client device may be associated with, or part of a computer network associated with, a credit reporting agency, or in communication with the agency's computer network (not shown). In other embodiments, client device 118 may be associated with a third party and is merely in communication with the agency's computer network. More specifically, client device 118 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client device 118 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices Database server 104 may be communicatively coupled to database 106 that stores data. In one embodiment, database 106 may include user data associated with users (e.g., demographics and location data), telematics data of the users, credit score data of the users, prediction data, third party data (e.g., relating to user data and credit score data from third parties), etc. In the exemplary embodiment, database 106 may be stored remotely from CSP computing device 102. In some embodiments, database 106 may be decentralized. In the exemplary embodiment, a user may access database 106 and/or CSP computing device 102 via user devices 108a and 108b.

Exemplary Client Computing Devices

Figure 2:
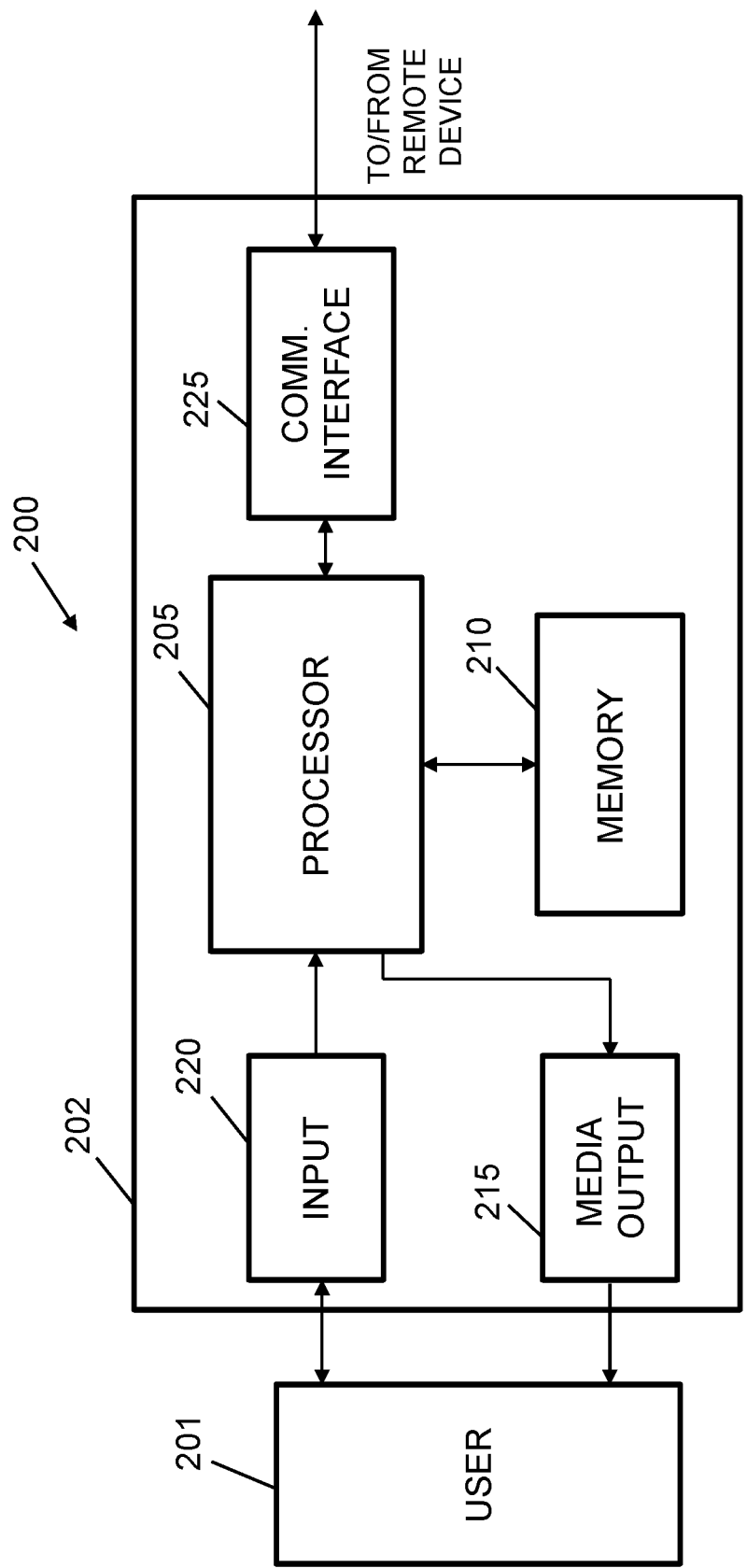
FIG. 2 illustrates an exemplary client computing device that may be used with the CSP computer system illustrated in FIG. 1.

FIG. 2 illustrates a block diagram 200 of an exemplary client computing device 202 that may be used with the credit score prediction (CSP) computing system 100 shown in FIG. 1. Client computing device 202 may be, for example, at least one of user devices 108a and 108b, institution devices 116a and 116b, and/or client computing device 118 (all shown in FIG. 1).

Client computing device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or other data to be stored and retrieved. Memory area 210 may include one or more computer readable media.

In exemplary embodiments, processor 205 may include and/or be communicatively coupled to one or more modules for implementing the systems and methods described herein. For example, in one exemplary embodiment, a module may be provided for receiving data and building a model based at least in part upon the received data. Received data may include, but is not limited to, demographic data pertaining to users, credit score data pertaining to users, and telematics data pertaining to users. A model may be built upon this received data, either by a different module or the same module that received the data. Processor 205 may include or be communicatively coupled to another module for generating a credit score prediction based at least in part upon received data pertaining to a user, such as one or more of driving history data, telematics data, GPS data, and demographics data.

In one or more exemplary embodiments, computing device 202 may also include one media output component 215 for presenting information a user 201. Media output component 215 may be any component capable of conveying information to user 201. In some embodiments, media output component 215 may include an output adapter such as a video adapter and/or an audio adapter. An output adapter may be operatively coupled to processor 205 and operatively coupled to an output device such as a display device (e.g., a liquid crystal display (LCD), a light emitting diode (LED) display, an organic light emitting diode (OLED) display, a cathode ray tube (CRT) display, an "electronic ink" display, a projected display, etc.) or an audio output device (e.g., a speaker arrangement or headphones). Media output component 215 may be configured to, for example, display a status of the model and/or display a prompt for user 201 to input user data. In another embodiment, media output component 215 may be configured to, for example, display a result of a credit score prediction generated in response to receiving user data described herein and in view of the built model.

Client computing device 202 may also include an input device 220 for receiving input from a user 201. Input device 220 may include, for example, a keyboard, a pointing device, a mouse, a stylus, a touch sensitive panel (e.g., a touch pad or a touch screen), a gyroscope (e.g., gyroscope 114, shown in FIG. 1), an accelerometer (e.g., accelerometer 112, shown in FIG. 1), a position detector (e.g., GPS 110, shown in FIG. 1), or an audio input device. A single component, such as a touch screen, may function as both an output device of media output component 215 and an input device of input device 220.

Client computing device 202 may also include a communication interface 225, which can be communicatively coupled to a remote device, such as CSP computing device 102, shown in FIG. 1. Communication interface 225 may include, for example, a wired or wireless network adapter or a wireless data transceiver for use with a mobile phone network (e.g., Global System for Mobile communications (GSM), 3G, 4G, or Bluetooth) or other mobile data networks (e.g., Worldwide Interoperability for Microwave Access (WIMAX)). The systems and methods disclosed herein are not limited to any certain type of short-range or long-range networks.

Stored in memory area 210 may be, for example, computer readable instructions for providing a user interface to user 201 via media output component 215 and, optionally, receiving and processing input from input device 220. A user interface may include, among other possibilities, a web browser or a client application. Web browsers may enable users, such as user 201, to display and interact with media and other information typically embedded on a web page or a website.

Memory area 210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAN). The above memory types are exemplary only, and are thus not limiting as to the types of memory usable for storage of a computer program.

Exemplary Server Systems

Figure 3:
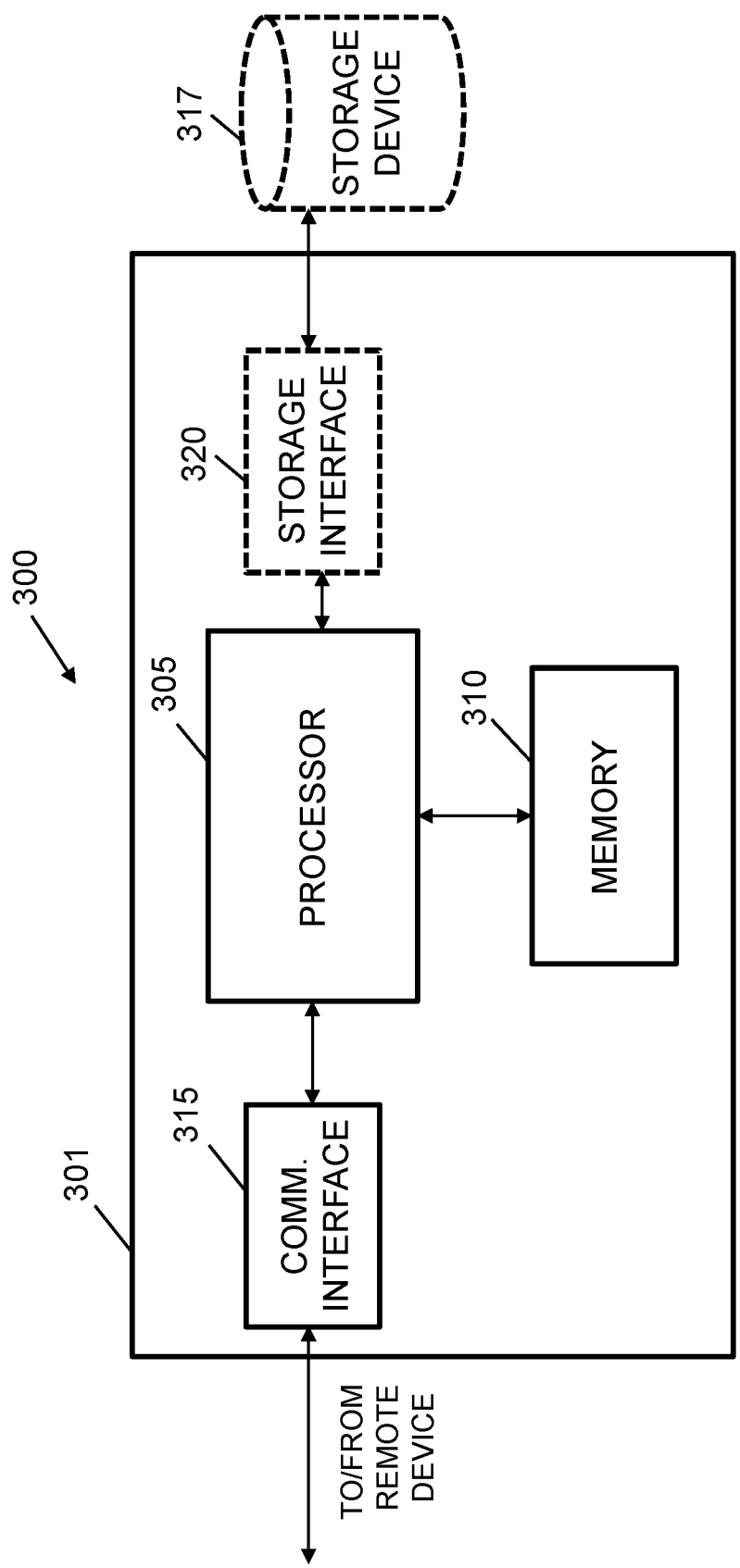
FIG. 3 illustrates an exemplary server system that may be used with the CSP computer system illustrated in FIG. 1.

FIG. 3 depicts a block diagram 300 showing an exemplary server system 301 that may be used with CSP computing system 100 illustrated in FIG. 1. Server system 301 may be, for example, CSP computing device 102 and/or database server 104 (shown in FIG. 1).

In exemplary embodiments, server system 301 may include a processor 305 for executing instructions. Instructions may be stored in a memory area 310. Processor 305 may include one or more processing units (e.g., in a multi-core configuration) for executing instructions. The instructions may be executed within a variety of different operating systems on server system 301, such as UNIX, LINUX, Microsoft Windows®, etc. It should also be appreciated that upon initiation of a computer-based method, various instructions may be executed during initialization. Some operations may be needed in order to perform one or more processes described herein, while other operations may be more general and/or specific to a particular programming language (e.g., C, C#, C++, Java, or other suitable programming languages, etc.).

Processor 305 may be operatively coupled to a communication interface 315 such that server system 301 is capable of communicating with CSP computing device 102, user devices 108, institution devices 116, client device 118 (all shown in FIG. 1), and/or another server system. For example, communication interface 315 may receive data from user devices 108a and 108b via the Internet.

Processor 305 may also be operatively coupled to a storage device 317, such as database 106 (shown in FIG. 1). Storage device 317 may be any computer-operated hardware suitable for storing and/or retrieving data. In some embodiments, storage device 317 may be integrated in server system 301. For example, server system 301 may include one or more hard disk drives as storage device 317. In other embodiments, storage device 317 may be external to server system 301 and may be accessed by a plurality of server systems. For example, storage device 317 may include multiple storage units such as hard disks or solid state disks in a redundant array of inexpensive disks (RAID) configuration. Storage device 317 may include a storage area network (SAN) and/or a network attached storage (NAS) system.

In some embodiments, processor 305 may be operatively coupled to storage device 317 via a storage interface 320. Storage interface 320 may be any component capable of providing processor 305 with access to storage device 317. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 317.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer system.

Exemplary Tables of User Records

FIG. 4 depicts an exemplary table 400 illustrated as training dataset that may be used for creating a model in one or more embodiments described herein. Only a few example records are shown for simplicity; however it is understood that a training dataset may include hundreds and/or thousands, of user data records.

In some embodiments, data provided may vary. At least one consistent value may be a user identifier, such as the user's name, which may include not only their name but a user ID number. In some embodiments, the user ID number may be serialized. In the example training dataset shown, each user data record may include one or more pieces of demographics information, a driving profile report, and at least one credit score.

In some embodiments, details of the demographics data may vary. As discussed herein, demographics relate to characteristics of a given population. A user may be described with respect to their key demographics and may include the user's income level, occupation, residency, race, gender, religion, or the like. In some embodiments, demographics may be provided by the user. Alternatively, or additionally, demographics data may be provided by an external source, such as third party data listings or US census data.

In some embodiments, details of a user's driving profile may be determined based at least in part upon telematics data gathered with respect to the user. In some embodiments, the user may have telematics data gathered over periods of time during the operation of a vehicle. Driving characteristics may be determined based at least in part upon sets of data measurements captured by sensory devices, such as by an accelerometer, a gyroscope, and other sensory devices. Telematics data, or driving characteristics, may reveal how safe a user is behind the wheel. In some embodiments, data may include different driver behaviors such as tendency to exceed or obey the speed limit within a certain threshold, hard vs. soft braking events, time of day driving, or even quick vs. slow cornering.

Another portion of a training data set may include credit scores of each user included in the dataset. As described herein, a credit score may typically be assigned to a user by a credit reporting agency. Further, a credit score may fall somewhere between 300 and 850, with 300 being on the low end and 850 being on the high end. Credit scores may be reported by one or more credit reporting agencies, such as TransUnion®, Equifax®, or Experian®. In some embodiments, user credit scores may be reported by the credit reporting agencies directly to the credit score prediction computing device for inclusion with the training datasets. Alternatively, or additionally, users may report their credit score, or scores, to the credit score prediction computing device, such as via a certified report received from one or more credit reporting agencies.

In at least one exemplary embodiment, the training dataset may aggregate data from a plurality of data sources, including third party data sources. Multiple training datasets may be used and analyzed to build the credit score prediction model described herein. In some embodiments, an error rate may be determined based at least in part upon the number of records included within the user data records files. In some embodiments, the more user data records that are provided, the smaller the error rate may be for a credit score prediction model.

Exemplary Methods for Generating a CSP Model

Figure 5:
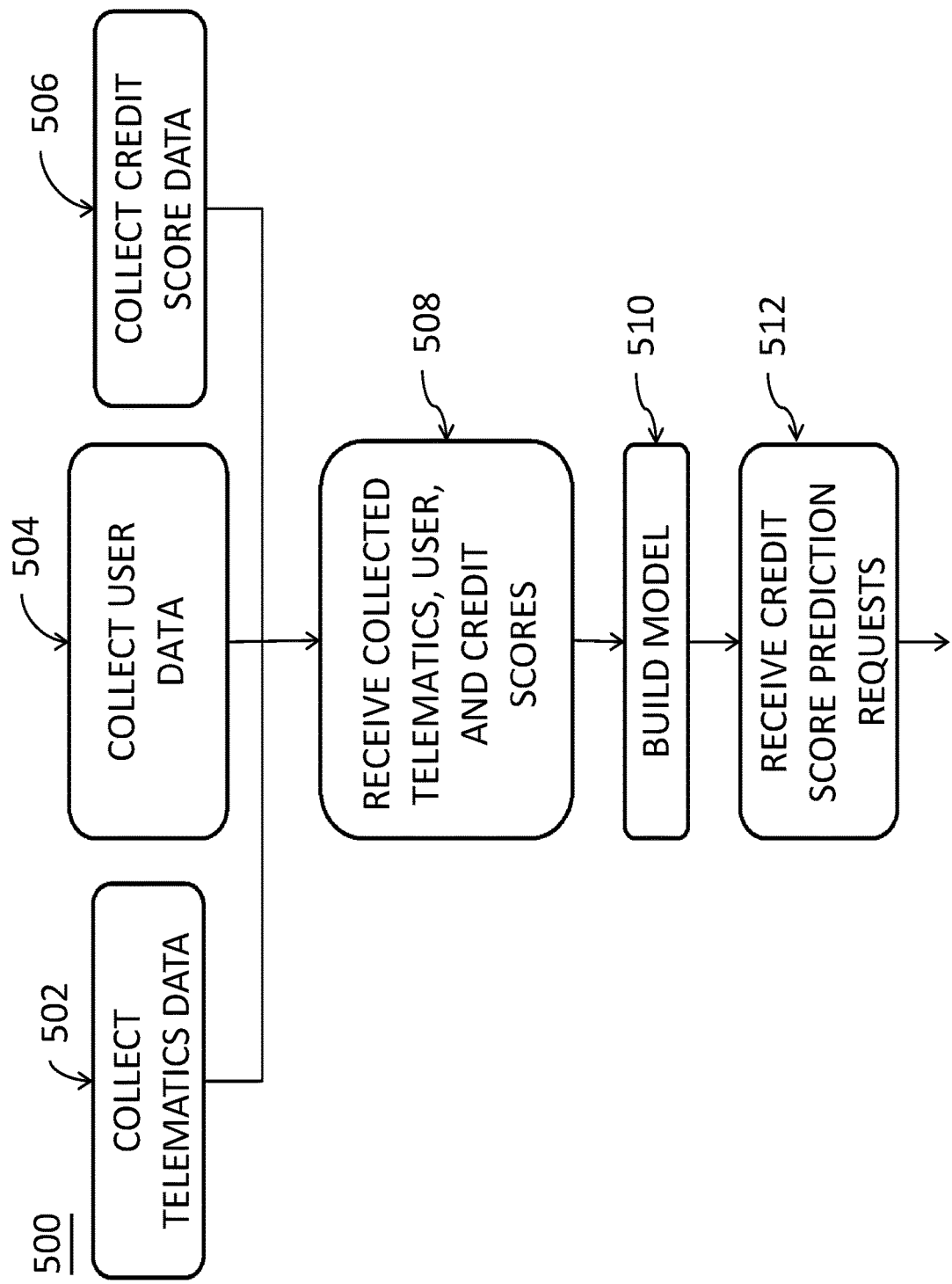
FIG. 5 illustrates an exemplary method for generating a model by the CSP computer system illustrated in FIG. 1.

FIG. 5 depict an exemplary method 500 for generating a credit score prediction (CSP) model. Method 500 may be performed by CSP computing device 102 (shown in FIG. 1). The generated model may be stored within a storage device associated with CSP computing device 102, such as database 106.

Method 500 may include collecting 502 telematics data, collecting 504 user data (e.g., demographics and/or location data), and collecting 506 of credit score data. Collected 502 telematics data, in some embodiments, may be from insurance companies, from one or more sensory devices associated with a user, or a combination thereof. Collected 504 user data, in some embodiments, may be collected from third party data sources, directly from users, or a combination thereof. Collected 506 user credit scores may be collected from credit reporting agencies, directly from users, or a combination thereof.

Method 500 may further include receiving 508 the collected telematics data, user data, and credit scores data at CSP computing device 102. CSP computing device 102 may, in some embodiments, collect data over a period of time for respective users and aggregate the data. Data aggregation may result in the creation of large training datasets, such as training dataset 400, shown in and described with reference to FIG. 4.

Method 500 may include building 510 a model, such as a credit score prediction (CSP) model. The model, through statistical analysis based at least in part upon the training datasets, may group certain populations having certain driving characteristics with credit score ranges. The model may be built 510 using any suitable machine learning and/or artificial intelligence techniques. For example, a group of users having similar driving characteristics (e.g., as determined by telematics data of the users) may be determined to be within a certain credit score range. The training datasets may be analyzed to identify similar parallels and consistencies among the data to accurately build 510 the CSP model.

Method 500 may also include receiving 512 credit score prediction requests from users. A credit score prediction request is additionally described with reference to FIG. 6. Once a certain number of training datasets have been analyzed, CSP model may be considered ready to receive credit score prediction requests.

The method 500 may include additional, less, or alternate actions, including those discussed elsewhere herein.

Exemplary Methods for Predicting a User's Credit Score

Figure 6:
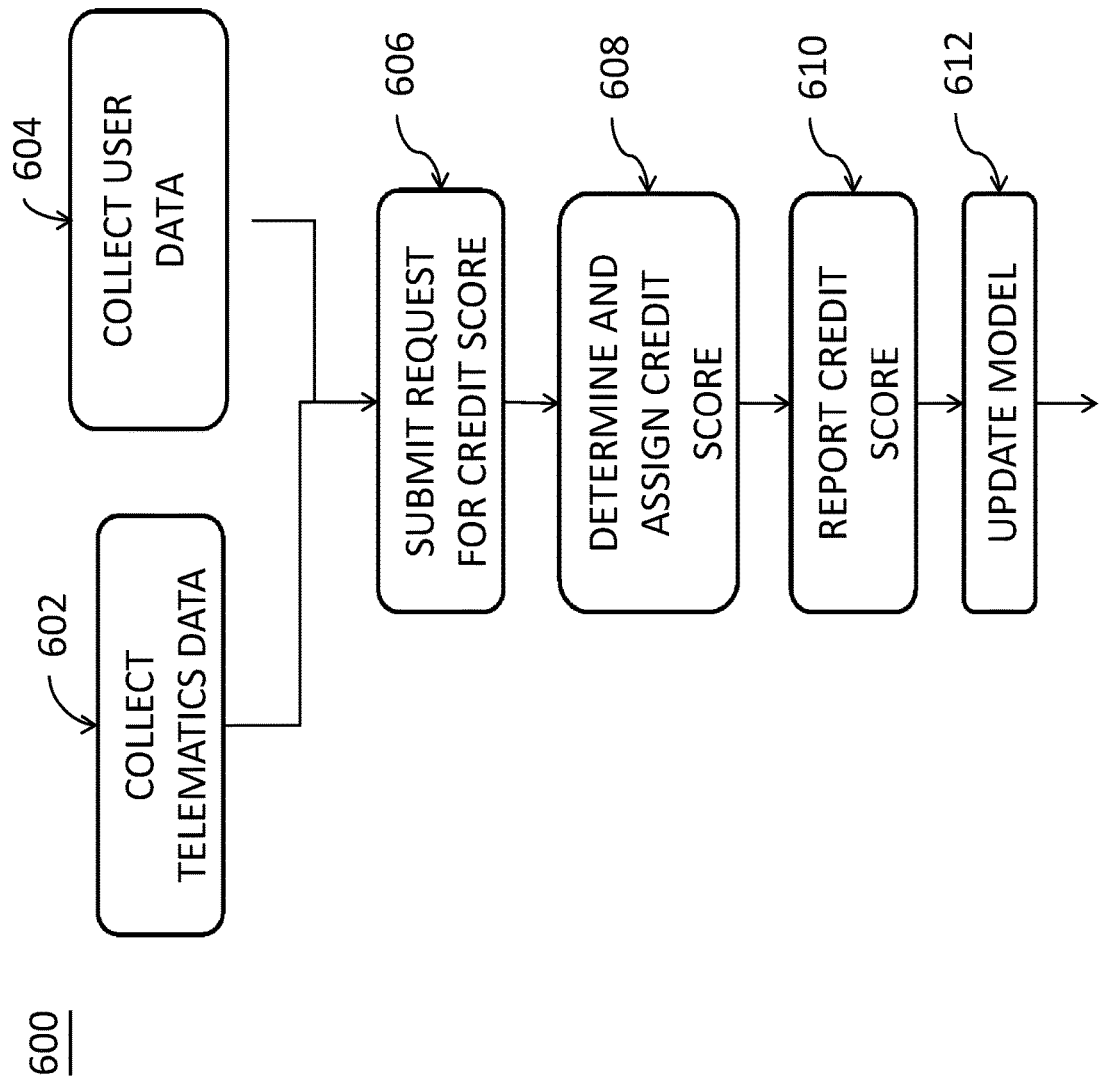
FIG. 6 illustrates an exemplary method for predicting a credit score by the CSP computer system illustrated in FIG. 1.

FIG. 6 illustrates an exemplary method 600 for generating a CSP model. Method 600 may be performed by CSP computing device 102 (shown in FIG. 1). The generated model may be stored within a storage device associated with CSP computing device 102, such as database 106.

Method 600 may include collecting 602 telematics data and collecting 604 user data (e.g., demographics and/or location data) for at least one user. In some embodiments, the user data may be encrypted in order to preserve user privacy. The encryption of the user data may also prevent tampering by the user or by others. In some embodiments, telematics data of the user may be collected by one or more sensory devices of the user's device, such as by an accelerometer, a gyroscope, GPS, or a combination thereof. Demographics data of the user may be collected by the user or via one or more third party data sources. For example, user data may be aggregated from a plurality of sources, such as from the user, from public data records, from U.S. census data banks, or a combination thereof.

Method 600 may further include submitting 606 a credit score prediction request. The request may be made by a user, by an external third party, such as a banking institution or loan officer, or the like. In some embodiments, the request may include collected telematics data, collected demographics data, or a combination thereof. The request may also include details for data retrieval from external sources, such as from a secure database. In some embodiments, the credit score prediction request may be submitted to a server device, such as CSP computing device 102.

Method 600 may include determining 608 and assigning 608 a credit score to the user. In some embodiments, the determined credit score may be made for a user in response to a request made by an institution. In some embodiments, the institution may be a bank, an employer, a landlord, a loan officer, or the like. Aggregated data of the user may be compared to a model, such as the generated CSP model (described with respect to FIG. 5), to determine an appropriate credit score of the user. In some embodiments, an error rating may be provided along with the credit score. Based at least in part upon the error rating, the credit score may be considered to be a user's actual credit score.

Method 600 may further include reporting 610 the credit score. In some embodiments, the credit score may be provided in a report to the user along with a certification. Additionally, or alternatively, the determined credit score may be issued to an external third party on behalf of the user. In another example, the determined credit score may be reported to a requesting institution or even an institution specified by the user, such as a specific bank or loan officer.

Method 600 may further include updating 612 the generated credit score prediction model. If the determined credit score is determined to be within a certain error rate, the user's information may be used as part of a training dataset to dynamically update the credit score prediction model used, such as the credit score prediction model generated in FIG. 5.

The method 600 may include additional, less, or alternate actions, including those discussed elsewhere herein.

Exemplary Computer Devices

Figure 7:
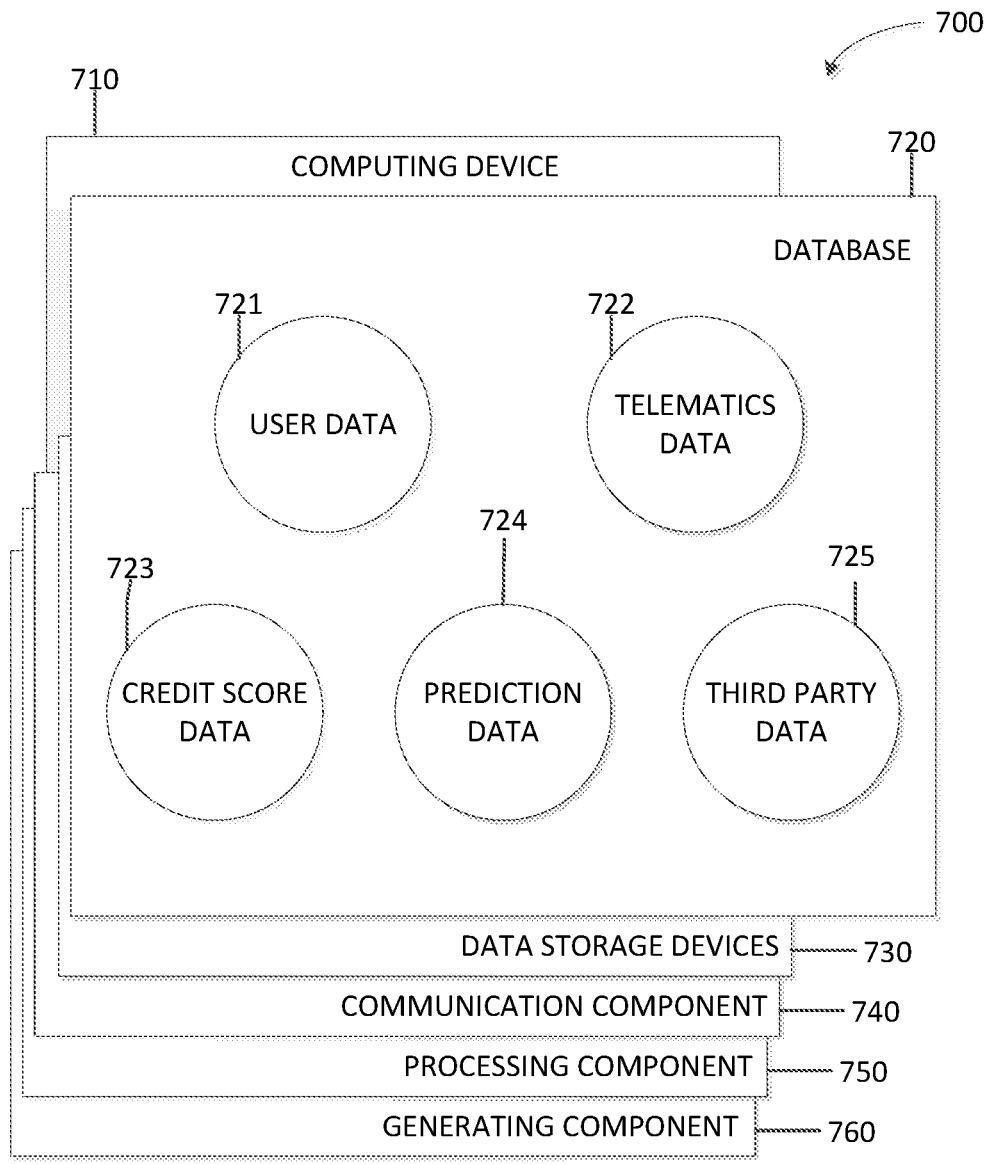
FIG. 7 illustrates a diagram of components of one or more exemplary computing devices that may be used in the exemplary CSP computer system shown in FIG. 1.

FIG. 7 depicts a diagram 700 of components of one or more exemplary computing devices that may be used in CSP system 100 (shown in FIG. 1) and/or to carry out methods 500 and 600 (shown in FIG. 5 and FIG. 6, respectively).

In some embodiments, computing device 710 may be similar to CSP computing device 102 (shown in FIG. 1). Database 720 may be coupled with several separate components within computing device 710, which perform specific tasks. In this embodiment, database 720 may include user data 721, telematics data 722, credit score data 723, prediction data 724, and third party data 725. In some embodiments, database 720 is similar to database 106 (shown in FIG. 1).

Computing device 710 may include database 720, as well as a data storage device 730. Computing device 710 may also include a communication component 740 for transmitting and receiving data between CSP computing device 102, user devices 108a and 108b, institution devices 116a and 116b (shown in FIG. 1), and client device 118. Computing device 710 may further include a processing component 750 that may, for example, process user data, telematics data, and credit score data. A generating component 760 may generate and/or update a credit score prediction model, as described herein.

Examples of Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based at least in part upon example inputs in order to make valid and reliable predictions for novel inputs.

Additionally or alternatively, the machine learning programs may be trained by inputting sample data sets or certain data into the programs, such as images, object statistics and information, audio and/or video records, text, and/or actual true or false values. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based at least in part upon the discovered rule, accurately predict the correct output. In unsupervised machine learning, the processing element may be needed to find its own structure in unlabeled example inputs.

As described above, the systems and methods described herein may use machine learning, for example, for pattern recognition. That is, machine learning algorithms may be used by CSP computing device 102, for example, to identify patterns in GPS data and telematics data of drivers as they correlate to credit scores of the drivers. These patterns establish the model that may then accurately predict the credit score of a person based at least in part upon their driving profile comprising of GPS data and telematics data. Accordingly, the systems and methods described herein may use machine learning algorithms for both pattern recognition and predictive modeling.

Exemplary Embodiments

In one aspect, a credit score prediction (CSP) computing device may be provided. The CSP computing device may comprise of at least one processor in communication with a memory device. The at least one processor may be configured to: retrieve, from the memory device, historical user data, historical vehicle telematics data, and historical credit score data associated with a plurality of users, build a model relating the historical credit score data to the historical user data and the historical vehicle telematics data, wherein the model configured to predict a credit score based at least in part upon user data and vehicle telematics data, store the model in the memory device, receive current vehicle telematics data associated with the user, and predict a credit score associated with the user using the model based at least in part upon the received current vehicle telematics data.

A further enhancement of the CSP computing device may include wherein the at least one processor is further configured to update the model based at least in part upon the predicted credit score, current user data, and current vehicle telematics data.

A further enhancement of the CSP computing device may include wherein the at least one processor is further configured to transmit the predicted credit score to at least one third party, wherein the at least one third party is at least one of a bank, a financial institution, a prospective employer, and a credit card company.

A further enhancement of the CSP computing device may include the processor further being configured to receive current user data, wherein the current user data includes one of demographics data and location data, and predict the credit score associated with the user using the model based at least in part upon the received current vehicle telematics data and the received user data.

A further enhancement of the CSP computing device may include wherein the historical vehicle telematics data comprises one or more measurements collected during operation of a vehicle including velocity, acceleration, direction, and driver behavior characteristics, the current vehicle telematics data comprises one or more measurements collected during operation of a vehicle including velocity, acceleration, direction, and driver behavior characteristics, and the historical user data includes one of demographics data and location data, and wherein the demographics data include one or more of income, education level, age, gender, or occupation.

A further enhancement of the CSP computing device may include wherein the current vehicle telematics data are gathered by one or more sensors during the operation of the vehicle and associated with the user, and the one or more sensors include a GPS device, an accelerometer, a gyroscope, or a sensor installed within the vehicle associated with the user.

A further enhancement of the CSP computing device may include wherein the model is built using machine learning, artificial intelligence, or a combination thereof.

A computer-implemented method for predicting a credit score of a user may be provided. The computer-implemented method may include the utilization of at least one processor in communication with a memory device. The method may include retrieving, from the memory device, at least one of historical data including historical telematics data, historical demographics data, and historical credit score data, building a model correlating at least one of the historical telematics data, historical demographics data, and historical credit score data, storing the model on the memory device, receiving, current telematics data associated with the user, and predicting a credit score of the user using the model based at least in part upon the received current vehicle telematics data.

A non-transitory computer-readable media having computer-executable instructions embodied thereon, wherein when executed by a credit score prediction (CSP) computing device including one processor in communication with a memory device may be provided. The computer-executable instructions may cause the at least one processor to: retrieve, from the memory device, at least one of historical user data, historical vehicle telematics data, and historical credit score data associated with a plurality of users, build a model relating the historical credit score data to the historical user data and the historical vehicle telematics data, wherein the model configured to predict a credit score based at least in part upon user data and vehicle telematics data, store the model in the memory device, receive current vehicle telematics data associated with the user, and predict a credit score associated with the user using the model based at least in part upon the received current vehicle telematics data.

Examples of Additional Considerations

As will be appreciated based at least in part upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable medium. In an exemplary embodiment, the system is executed on a single computer system, without needing a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

I claim:

1. A credit score prediction (CSP) computing device comprising at least one processor in communication with a memory device, the at least one processor configured to:
    retrieve, from the memory device, historical user data, historical vehicle telematics data, and historical credit score data associated with a plurality of users;
    build a model using the historical credit score data, the historical user data and the historical vehicle telematics data, wherein to build the model, the at least one processor is configured to:
        select a group of users from the plurality of users, the group of users having similar driving characteristics and within a predetermined credit score range;
        generate a training dataset including the historical credit score data, the historical user data and the historical vehicle telematics data of each user in the group of users, as selected; and
        train the model using the training dataset, wherein the training dataset is formed from a plurality of data sources including a demographic data source and a telematics data source that is different from the demographic data source;
    store the model, as trained, in the memory device;
    receive current user data and current vehicle telematics data associated with a first user, wherein:
        the current vehicle telematics data are collected by one or more sensors during operation of a vehicle and associated with the first user; and
        the one or more sensors are installed within the vehicle associated with the first user and include at least one selected from a group consisting of a GPS device, an accelerometer, and a gyroscope;
    apply the model, as trained, to the current user data and the current vehicle telematics data to predict a credit score associated with the first user;
    determine a probability of error associated with the credit score, as predicted, based upon a number of records in the current vehicle telematics data, wherein the probability of error is lower when the number of records in the current vehicle telematics data is higher;
    determine that the probability of error is within a predetermined range; and
    update the model, as trained, based at least in part upon the credit score, as predicted, the current user data, and the current vehicle telematics data.

2. The CSP computing device of claim 1, wherein the at least one processor is further configured to:
    transmit the credit score, as predicted, to at least one third party, wherein the at least one third party is one of a bank, a financial institution, a prospective employer, and a credit card company.

3. The CSP computing device of claim 1, wherein to receive the current user data, the at least one processor is configured to:
    receive the current user data including demographics data and location data.

4. The CSP computing device of claim 1, wherein:
    the historical vehicle telematics data comprises one or more measurements collected during operation of a vehicle including at least one selected from a group consisting of velocity, acceleration, direction, and driver behavior characteristics;
    the current vehicle telematics data comprises one or more measurements collected during operation of a vehicle including at least one selected from a group consisting of velocity, acceleration, direction, and driver behavior characteristics; and the historical user data includes at least one selected from a group consisting of historical demographics data and historical location data, and wherein the historical demographics data include at least one selected from a group consisting of income, education level, age, gender, and occupation.

5. The CSP computing device of claim 1, wherein the model, as trained, is built using machine learning, artificial intelligence, or a combination thereof.

6. A computer-implemented method for predicting a credit score of a first user, the computer-implemented method implemented by a credit score prediction (CSP) computing device including one processor in communication with a memory device, the method comprising:

retrieving, from the memory device, historical user data, historical vehicle telematics data, and historical credit score data associated with a plurality of users;

building a model using the historical credit score data, the historical user data and the historical vehicle telematics data, wherein the building the model includes:

selecting a group of users from the plurality of users, the group of users having similar driving characteristics and within a predetermined credit score range;

generating a training dataset including the historical credit score data, the historical user data and the historical vehicle telematics data of each user in the group of users, as selected; and training the model using the training dataset, wherein the training dataset is formed from a plurality of data sources including a demographic data source and a telematics data source that is different from the demographic data source;

storing the model, as trained, in the memory device;

receiving current user data and current vehicle telematics data associated with the first user, wherein:

the current vehicle telematics data are collected by one or more sensors during operation of a vehicle and associated with the first user; and the one or more sensors are installed within the vehicle associated with the first user and includes at least one selected from a group consisting of a GPS device, an accelerometer, a gyroscope, and a sensor;

applying the model, as trained, to the current user data and the current vehicle telematics data to predict the credit score associated with the first user;

determining a probability of error associated with the credit score, as predicted, based upon a number of records in the current vehicle telematics data, wherein the probability of error is lower when the number of records in the current vehicle telematics data is higher; and update the model, as trained, based at least in part upon the credit score, as predicted, the current user data, and the current vehicle telematics data.

7. The computer-implemented method of claim 6 further comprising:

transmitting the credit score, as predicted, to at least one third party, wherein the at least one third party is one of a bank, a financial institution, a prospective employer, and a credit card company.

8. The computer-implemented method of claim 6, wherein the receiving the current user data includes receiving current demographics data and current location data.

9. The computer-implemented method of claim 6, wherein:

the historical vehicle telematics data comprises one or more measurements collected during operation of a vehicle including at least one selected from a group consisting of velocity, acceleration, direction, and driver behavior characteristics;

the current vehicle telematics data comprises one or more measurements collected during operation of a vehicle including at least one selected from a group consisting of velocity, acceleration, direction, and driver behavior characteristics; and the historical user data includes at least one selected from a group consisting of historical demographics data and location data, and wherein the historical demographics data include at least one selected from a group consisting of income, education level, age, gender, and occupation.

10. The computer-implemented method of claim 6, wherein the model, as trained, is built using machine learning, artificial intelligence, or a combination thereof.

11. At least one non-transitory computer-readable media having computer-executable instructions embodied thereon, wherein when executed by a credit score prediction (CSP) computing device including at least one processor in communication with a memory device, the computer-executable instructions cause the at least one processor to:

retrieve, from the memory device, historical user data, historical vehicle telematics data, and historical credit score data associated with a plurality of users;

build a model using the historical credit score data, to the historical user data and the historical vehicle telematics data, wherein to build the model, the at least one processor is configured to:

select a group of users from the plurality of users, the group of users having similar driving characteristics and within a predetermined credit score range;

generate a training dataset including the historical credit score data, the historical user data and the historical vehicle telematics data of each user in the group of users, as selected; and train the model using the training dataset, wherein the training dataset is formed from a plurality of data sources including a demographic data source and a telematics data source that is different from the demographic data source;

store the model, as trained, in the memory device;

receive current user data and current vehicle telematics data associated with a first user, wherein:

the current vehicle telematics data are collected by one or more sensors during operation of a vehicle and associated with the first user; and the one or more sensors are installed within the vehicle associated with the first user and include at least one selected from a group consisting of a GPS device, an accelerometer, a gyroscope, and a sensor;

apply the model, as trained, to the current user data and the current vehicle telematics data to predict a credit score associated with the first user;

determine a probability of error associated with the credit score, as predicted, based upon a number of records in the current vehicle telematics data, wherein the probability of error is lower when the number of records in the current vehicle telematics data is higher; and update the model, as trained, based at least in part upon the credit score, as predicted the current user data, and the current vehicle telematics data.

12. The at least one non-transitory computer-readable media of claim 11, wherein the at least one processor is further caused to:
  transmit the credit score, as predicted, to at least one third party, wherein the at least one third party is one of a bank, a financial institution, a prospective employer, and a credit card company.

13. The at least one non-transitory computer-readable media of claim 11, wherein to receive the current user data, the at least one processor is further caused to:
  receive the current user data including demographics data and location data.

14. The at least one non-transitory computer-readable media of claim 11, wherein:
  the historical vehicle telematics data comprises one or more measurements collected during operation of a vehicle including at least one selected from a group consisting of velocity, acceleration, direction, and driver behavior characteristics;
  the current vehicle telematics data comprises one or more measurements collected during operation of a vehicle including at least one selected from a group consisting of velocity, acceleration, direction, and driver behavior characteristics; and
  the historical user data includes at least one selected from a group consisting of historical demographics data and historical location data, and wherein the historical demographics data include at least one selected from a group consisting of income, education level, age, gender, and occupation.

15. The CSP computing device of claim 1, wherein the at least one processor is further configured to:
  determine that the probability of error is lower than a threshold; and
  use the credit score, as predicted, to update the credit score associated with the first user.

* * * * *